United States Patent [19]

Smedley et al.

[11] 4,134,621

[45] Jan. 16, 1979

[54] ANTI-WHEEL LOCK SYSTEM FOR TANDEM AXLES

[75] Inventors: Daniel G. Smedley, Dearborn Heights; Gary L. Hopkins, Farmington; John A. Urban, Livonia, all of Mich.

[73] Assignee: Eaton Corporation, Cleveland, Ohio

[21] Appl. No.: 831,903

[22] Filed: Sep. 9, 1977

[51] Int. Cl.$^2$ .............................................. B60T 8/02
[52] U.S. Cl. .................................. 303/96; 303/20; 303/109
[58] Field of Search .................. 188/181; 303/20, 91, 303/96, 97, 106, 111, 92; 307/351, 355, 357, 233 B; 324/161; 328/147; 340/53, 62; 361/238, 242

[56] References Cited

U.S. PATENT DOCUMENTS

| | | | |
|---|---|---|---|
| 3,802,749 | 4/1974 | Carp et al. | 303/96 |
| 3,843,207 | 10/1974 | Syria | 303/97 |
| 3,912,034 | 10/1975 | Pallof | 303/96 X |
| 3,920,280 | 11/1975 | Luhdorff et al. | 303/106 X |
| 3,929,382 | 12/1975 | McNinch, Jr. et al. | 303/96 X |
| 3,951,466 | 4/1976 | Guagliumi et al. | 303/97 |
| 3,966,267 | 6/1976 | McNinch, Jr. et al. | 303/106 |
| 4,049,325 | 9/1977 | Reinecke | 303/92 |

*Primary Examiner*—Stephen G. Kunin

*Attorney, Agent, or Firm*—Blanchard, Flynn, Thiel, Boutell & Tanis

[57] ABSTRACT

An anti-wheel lock, system for a vehicle with tandem axles each having a pair of rotatable wheels, the vehicle having a braking system for applying braking forces to such wheels. A brake control device responds to an applied lock signal for controlling the braking system to relieve the braking forces on the wheels. The input circuitry provides for distinct wheel speed signals having values respectively representing the wheel speeds of the four wheels (or wheel sets) carried by the tandem axles. A high wheel gate continuously produces a signal representing the speed of the fastest rotating one of the four wheels by determining the fastest rotating wheel on each pair and then the fastest moving wheel between the pairs. A low wheel gate similarly obtains and continuously provides a signal related to the speed of the slowest moving wheel of the four. An average wheel gate of simplified construction produces a signal simulating the average wheel speed by in effect averaging the outputs of the high and low wheel gates. In a preferred embodiment the speed signals fed to the gates are provided by nonlinear frequency to voltage convertors driven in response to corresponding ones of the four wheels. Logic circuitry provides a locked wheel signal when values of, and changes in, the speed signals from such gates indicate or predict a skid condition.

9 Claims, 2 Drawing Figures

ANTI-WHEEL LOCK SYSTEM FOR TANDEM AXLES

FIELD OF THE INVENTION

This invention relates to an anti wheel lock control system for controlling the braking forces applied to the wheels of a vehicle having a braking system, and more particularly to an anti wheel lock control system for a vehicle having tandem axles with braked, independently rotatable wheels.

BACKGROUND OF THE INVENTION

U.S. Pat. No. 3,966,267 and 3,929,382, assigned to the assignee of the present invention, disclose vehicle anti-lock systems of the type providing a signal for releasing the braking forces on the wheels of a vehicle, under particular wheel operating conditions, to minimize wheel locking due to braking, as coved result in vehicle skidding.

Systems of this kind have provided a lock signal when deceleration detection circuitry, for example, senses that the speed of a braked wheel is decreasing at a rate substantially faster than is vehicle speed, indicating an impending wheel lock condition, for releasing the braking force and thereafter permitting the subject wheel to spin up toward vehicle velocity, whereafter braking force is again restored to continue slowing the vehicle.

Said systems also have included fixed bleed circuitry providing a lock signal when the average, for example, wheel speed decreases below a declining reference signal representing a desired rate of decline in the speed of the faster wheel, and hence the vehicle. This circuit is useful, under a light load or low coefficient of friction conditions where the deceleration logic lock signal may have inadequate time to release the brakes prior to abatement of the deceleration logic lock signal due to lockup (cessation of deceleration) of such wheel. Particularly, the fixed bleed logic overcomes this problem by furnishing its own lock signal before wheel lockup. The fixed bleed circuit thereafter terminates its own lock signal when the subject wheel has spun up to a desired fraction of the vehicle speed.

Such prior skid control systems have also provided differential wheel speed logic to produce a lock signal where the speeds of two wheels being monitored differ substantially, as during braking where one wheel is on ice and the opposed wheel is on dry pavement, and lockup of the former is to be avoided.

Reference is made hereto co-pending application Ser. No. 831,908, filed Sept. 9, 1977 entitled Anti-Wheel Lock System, and assigned to the assignee of the present invention. Such application is directed to improvements over prior anti-lock systems of the type exemplified by the above-mentioned two patents.

The present invention is directed to an anti-lock system, generally of the type including those of the patents and application above-referenced, but particularly directed to anti-lock control of independently rotatable wheels on more than one axle. A typical example of the present invention involves anti-lock control of four braked, individually rotatable wheels carried at the ends of a pair of vehicle axles (e.g. tandem axles). It will be understood that the term wheel is here used broadly to include the wheel assembly at an end of an axle, whether such wheel assembly includes one, or more, individual wheel (tire and rim) units.

Accordingly, the objects of this invention include provision of:

A lock control system capable of anti-wheel lock control of braked, independently rotatable wheels on more than one axle, and particularly, braked independently rotatable wheels at the ends of tandem axles.

A system, as aforesaid, in which four distinct wheel speed signals are obtained, each representing the instantaneous speed of a corresponding one of said wheels, and wherein high and low wheel speed signals each are selected from all four of such wheel speed signals, wherein the thus detected high speed and low speed wheels may be on the same axle, different axles, and in the latter instance, on the same or opposite sides of the vehicle, dependent on vehicle operating conditions at that time.

A system, as aforesaid, which uses the aforementioned high wheel and low wheel signals, for example, from four wheels, to produce an intermediate signal which may be used to at least generally represent the average of the speeds of the four wheels.

A system, as aforesaid, in which the resultant average wheel speed signal is a weighted average, the weighting being in favor of the high wheel speed signal.

A system, as aforesaid, in which deceleration detector response speed is enhanced by causing same to monitor the low wheel speed signal so as to timely detect impending possible lockup in one of the wheels of the tandem axle set and where the remaining wheels, and hence the average of all four wheel speed signals, reflects a satisfactory slip condition during braking.

A system, as aforesaid, which permits adaptation, to tandem axles, of a system similar to that of our aforementioned copending application, with minimal revision, addition of parts and extra cost.

Other objects and purposes of this invention will be apparent to persons acquainted with apparatus of this general type upon reading the following specification and inspecting the accompanying drawings.

SUMMARY OF THE INVENTION

The objects and purposes of the invention are met by providing a wheel lock control, or anti-wheel lock, system for a vehicle with tandem axles each having a pair of rotatable wheels, the vehicle having a braking system for applying braking forces to such wheels. A brake control device responds to an applied lock signal for controlling the braking system to relieve the braking forces on the wheels. The input circuitry provides for distinct wheel speed signals having values respectively representing the wheel speeds of the four wheels (or wheel sets) carried by the tandem axles. A high wheel gate continuously produces a signal representing the speed of the fastest rotating one of the four wheels. A low wheel gate similarly obtains and continously provides a signal related to the speed of the slowest moving wheel of the four. An average wheel gate of simplified construction produces a signal simulating the average wheel speed by in effect averaging the outputs of the high and low wheel gates. In a preferred embodiment the speed signals fed to the gates are provided by nonlinear frequency to voltage convertors driven in response to corresponding ones of the four wheels. Logic circuitry provides a lock signal when values of, and changes in, the speed signals from such gates indicate or predict a wheel lock condition.

DETAILED DESCRIPTION

Figure 1:
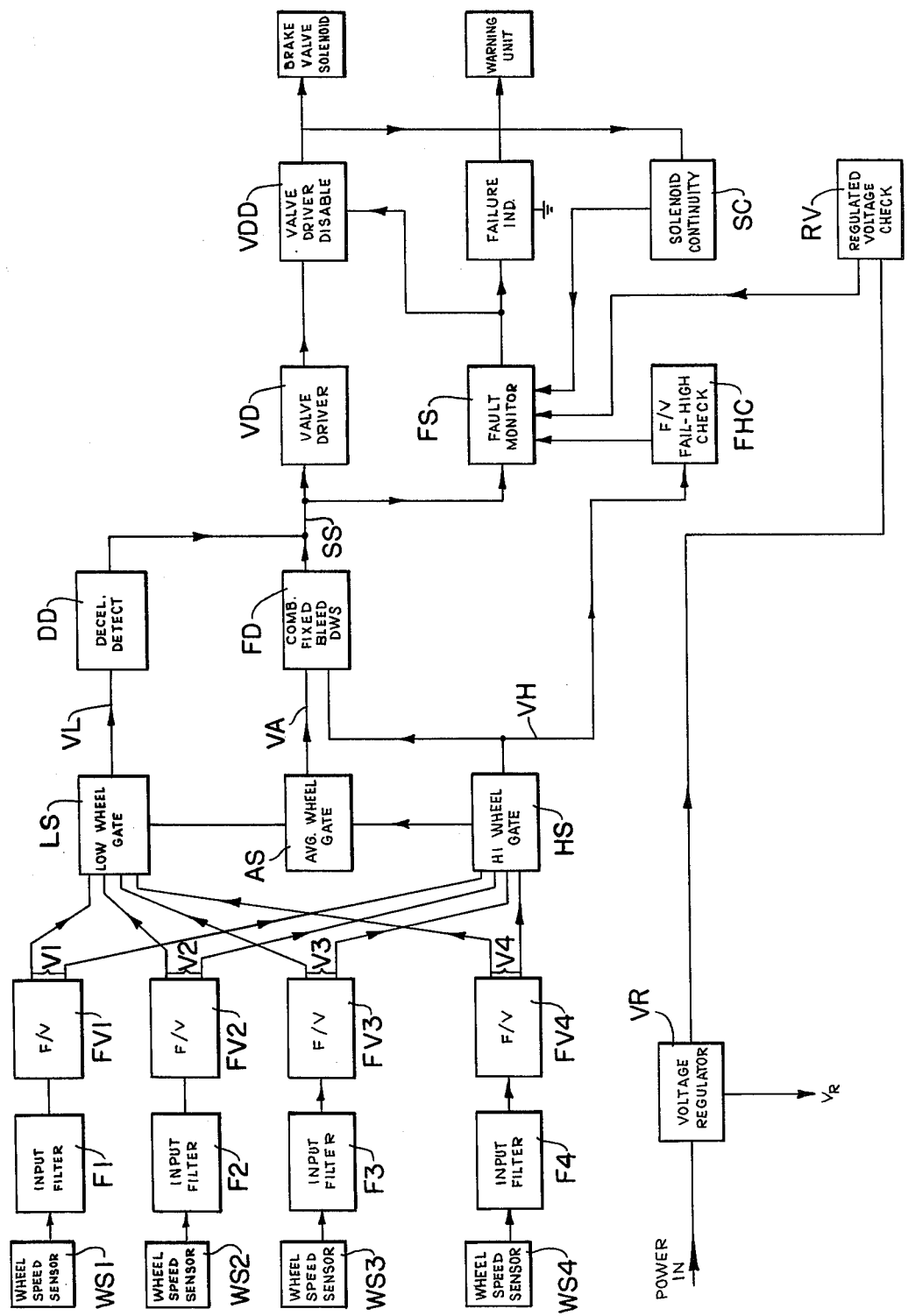
FIG. 1 is a block diagram of an anti-wheel lock system for multiple, independently rotatable wheels, preferably for tandem axles, and embodying the invention.

FIG. 1 discloses a preferred embodiment of the invention, wherein the speeds of four braked, independently rotatable wheels on a vehicle are independently monitored by respective wheel speed sensors WS-1–WS-4. The wheel speed sensors may be of any conventional type capable of developing an alternating signal having a frequency substantially proportional to wheel speed, such as an AC tachometer generator. In a preferred use, the sensors WS-1–WS-4 monitor the left and right wheels on the forward axle and left and right wheels on the rearward axle of a tandem axle set.

The sensors WS-1–WS-4 are connected through respective input filter circuits F1–F4 to drive frequency to voltage convertors FV1–FV4, which provide speed signals of amplitude respresenting the speed of the corresponding vehicle wheel. The several (here four) wheel speed signals from the frequency to voltage convertors are all applied to a low wheel gate LS, which prasses onto line VL the instantaneous speed signal for the then lowest speed one of the wheels. A high wheel gate HS also receives all four of the wheel speed signals and passes onto line VH the instantaneous speed signal for the highest speed one of the wheels.

An average wheel gate produces a signal indicated at VA which in effect is to represent, or stand in place of, the average of the four wheel speed signals. However, the average wheel gate AS drives its output signal VA from the outputs VL and VH of the low wheel and high wheel gates LS and HS, respectively, and preferably, as hereafter discussed, weights such signal VA in favor of the latter.

Under certain conditions, indicative of lockup or incipient lockup in one or more of the vehicle wheels being monitored, lock signals are produced by circuits here including a deceleration detector DD and fixed bleed and differential wheel speed circuitry here combined in a combination circuit FD. It has been found advantageous where more than a pair of wheels (e.g. in a tandem axle situation) is to be monitored, that the speed signal applied to the deceleration detector circuit be from the low wheel line VL. The combination fixed bleed - DWS circuit FD is driven by the simulated average wheel speed line VA and, to provide an indication of vehicle speed, the high wheel line VH.

The remaining circuitry shown on the FIG. 1 block diagram may incorporate suitable circuitry detail, as desired, but may be identical with and preferably similar to correspondingly identified circuitry disclosed in detail in said co-pending U.S. application Ser. No. 831,908, entitled Anti-Wheel Lock System, the content of which is incorporated by reference herein.

To briefly summarize the operation of such remaining portion of the FIG. 1 block diagram, lock signals on line SS cause a valve driver VD to actuate a brake valve solenoid, in turn to disable the vehicle braking system, such that initiation of a lock signal initiates disabling of the braking system and cessation of the lock signal permits the braking system to once again brake the monitored wheels. To avoid improper actuation of the brake valve solenoid, a fault monitor FS monitors several internal parameters of the lock control system and when a monitored parameter or subcircuit failure occurs, the fault monitor FS causes a valve driver disable circuit VDD to block energization of the brake valve solenoid by the valve driver and also triggers a failure indicator and warning unit of suitable type to warn the vehicle operator of the sensed system malfunction. The fault monitor FS thus provides a suitable output (to actuate the valve driver disable unit VDD and failure indicator) in the absence of a lock signal on line SS and F/V fail high check circuit FHC responds to an excessively high signal on high wheel line VH (suggesting a failure of one of the F/V convertors FV1–FV4) for triggering the fault monitor FS. A regulated voltage check circuit RV responds to an excessively low voltage from the power supply voltage regulator VR (which supplies operating potential to the FIG. 1 circuitry) for triggering the fault monitor FS. In addition, a solenoid continuity check circuit SC responds to the failure of the brake valve solenoid, preferably to either an open or a short therein, by triggering the fault monitor FS.

Figure 2:
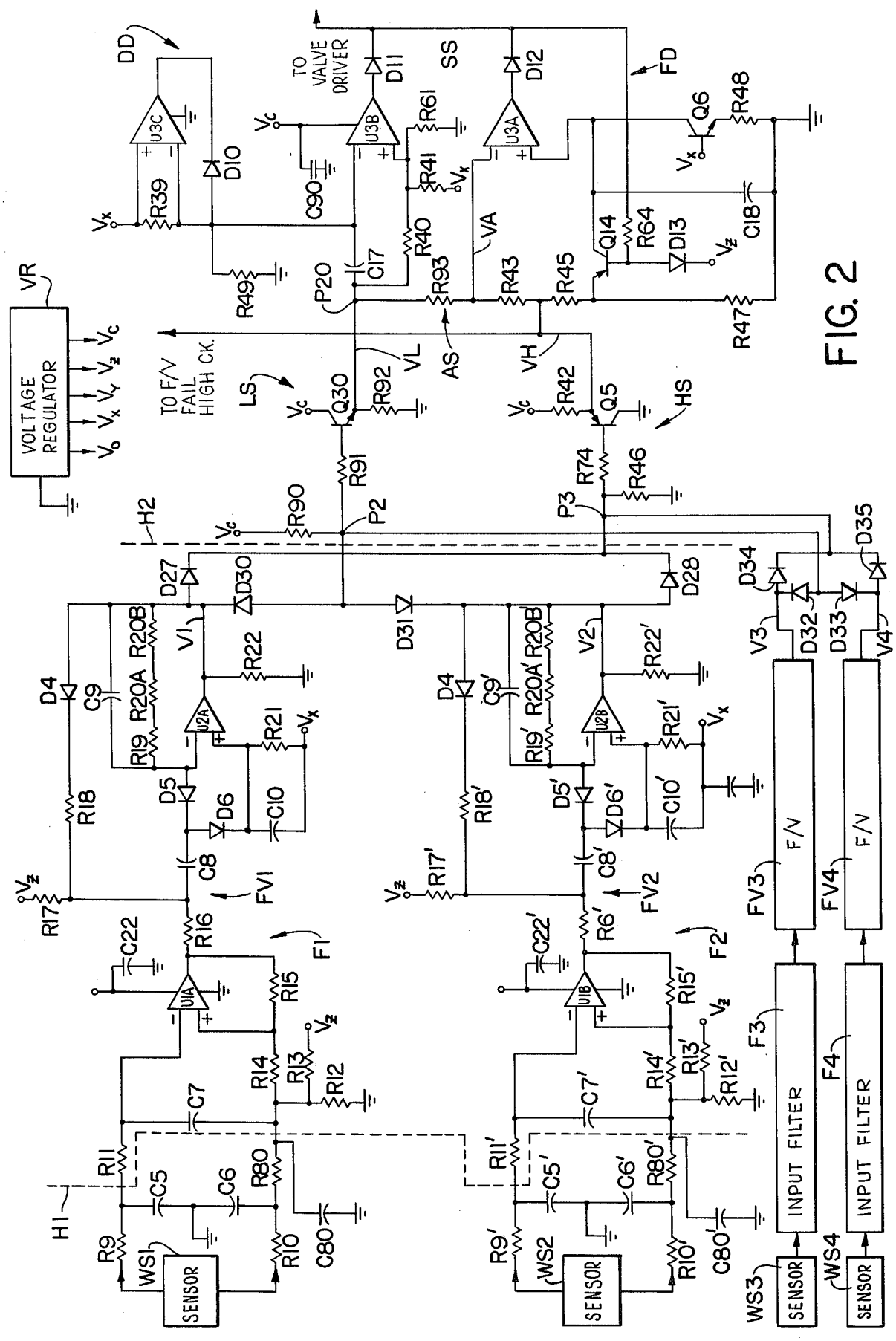
FIG. 2 presents a portion of the FIG. 1 system in schematic form.

In the preferred embodiment disclosed in FIG. 2, the input filter F1 and frequency to voltage convertor FV1 are similar in circuitry to the corresponding input filter and frequency to voltage convertor circuitry disclosed in the aforementioned U.S. application Ser. No. 831,908, entitled Anti-Wheel Lock System. Briefly, the input filter F1 includes an input comprising resistors R9, R10 and capacitors C5, C6, connected across the output of wheel speed sensor WS1 of the first wheel to be monitored and forming a filter to eliminate high frequency (100 kilohertz and higher) noise. In the particular embodiment hereshown, additional high frequency noise elimination is provided by a further resistor R80 and capacitor C80 connecting the lower end of a capacitor C7 respectively to capacitor C6 and ground. Resistor R11 and capacitor C7 connected in series with resistor R80 across capacitor C5 and C6 roll off the amplitude of the frequency signal from sensor WS1 where, as typical, the sensor output amplitude itself increases as a function of speed, and thereby provides a substantially constant amplitude frequency signal across capacitor C7 within the working range of the sensor WS1.

A suitable comparator U1A is coupled across the capacitor C7 to square the wave form of the alternating frequency signal appearing across capacitor C7. The voltage divider comprising resistors R13 and R12 connected from the voltage regulator output $V_Z$ to ground sets the DC level on the capacitor C7 (for example at 3 volts) to permit the negative input of the comparator U1A to swing both positively and negatively from that level (e.g. up to about 6 volts and down to ground) and still stay within the working range of the comparator U1A.

Resistors R14 and R15 provide the comparator U1A with a hysteresis effect, reducing false switching of the comparator due to low amplitude noise. Particularly, the resistors R14 and R15 require a certain minimum voltage swing (for example about 160 millivolts peak to peak) across the input of the comparator U1A before the latter will switch, and thereby protecting against false switching due to low amplitude noise.

The squarewave frequency signal from input filter unit F1 is taken from the output of comparator U1A and applied through the input resistor R16 of the frequency to voltage convertor FV1. Capacitor C8 produces positive going and negative going pulses due to the positive going and negative going swings of the frequency signal. The pulses of each polarity are applied through respective, oppositely oriented diodes D6 and D5 to integration networks (capacitor C10 and resistor R21 on the one hand and capacitor C9 and series resistors R19, R20A and R20B on the other hand) connected to the positive and negative inputs to convertor operational amplifier U2A, as well as to voltage regulator output VX and the output of the operational amplifier U2A, to provide the latter with a DC output of amplitude related to the frequency signal applied to the capacitor C8. The values of resistors R20A and R20B determine the gain of the operational amplifier U2A and resistor R22 provides a load, or sink, for the operational amplifier to enhance its stability.

In the preferred embodiment shown, the relation between the output amplitude and input frequency in the frequency to voltage convertor FV1 is nonlinear, and this is achieved by cooperation of the voltage divider formed by series resistors R17 and R16 connected between the regulator output VZ and the output of comparator U1A, along with series diode D4 and resistor R18 connected from the output of convertor operational amplifier U2A intermediate divider resistors R17 and R16 and hence to the input side of capacitor C8. More particularly, when the output of comparator U1A is low, and given a low amplitude output from operational amplifier U2A (a low wheel speed condition), diode D4 will not conduct and blocks current flow through resistor R18. Accordingly, only resistors R17 and R16 provide the voltage divider to which input capacitor C8 connects. However, a sufficient increase in the output amplitude of operational amplifier U2A starts diode D4 conducting, such that the voltage divider to which input capacitor C8 is connected now additionally includes resistor R18 as well as the first resistors R17 and R16. With the squarewave output of the comparator U1A at the low voltage end of its swing, the voltage applied to capacitor C8 will be at some minimum value corresponding to the IR drop across resistor R16 and is thus lowest at low wheel speed with only resistor R17 supplying current, but is higher at higher wheel speeds with additional current being supplied through the then conductive diode D4 and resistor R18 to increase the IR drop across such resistor R16. On the other hand, with the squarewave output voltage of comparator U1A at the high end of its swing, the comparator U1A has essentially an open collector output and its output voltage thus comes substantially all the way up to maximum (for example 6.2 volts). Accordingly, the swing of the input voltage to capacitor C8 is larger at low wheel speeds than at high wheel speeds, and this provides the mentioned nonlinearity of the frequency to voltage convertor FV1. The preferred frequency to voltage convertor FV1 thus is double acting (responds to both positive and negative swings of the input frequency signal), has a noise limiting hysteresis effect, and has a nonlinear input to output characteristic.

The input filter F2 and convertor FV2 driven by the second wheel speed sensor WS2 are preferably identical to the above-described filter F1 and convertor FV1 and have their components correspondingly numbered, though with a prime mark added thereto. Input filters F3 and F4 and convertors FV3 and FV4 are also preferably identical in circuitry to input filter F1 and convertor FV1 and hence their internal circuitry need not be shown.

The varying amplitude speed signal output of convertor FV1 is taken at the output of its operational amplifier U2A, as indicated at V1. Corresponding speed signal outputs from convertors FV2, FV3 and FV4 are taken on corresponding lines V2, V3 and V4.

Within the broader aspects of the present invention, generation of speed signals other than as above-discussed is contemplated.

The low wheel gate LS comprises a pair of diodes D30 and D31 having their cathodes connected to wheel speed signal lines V1 and V2, respectively, and their anodes connected back-to-back and to a junction point P2. Similar diodes D32 and D33 are connected at their cathodes to the wheel speed signal lines V3 and V4 and have their anodes connected back-to-back and to the same junction point P2. Junction point P2 connects to a positive output of the DC supply voltage regulator VR through a dropping resistor R90. Current flow from the supply point VC through the resistor R90 biases conductive the one of diodes D30-D33 connected to the one of wheel signal lines V1-V4 carrying the lowest amplitude signal at any given moment. Accordingly, the voltage drop across resistor R90 fluctuates in accord with the level on the lowest voltage ones of lines V1-V4 and the potential at point P2 proportionally follows the potential on whichever one of wheel signal lines V1-V4 happens at that time to be at the lowest amplitude. An emitter follower transistor Q30 with its collector connected to positive voltage supply point VC and its emitter connected through a load resistor R92 to ground receives at its base, through resistor R91, the potential at point P2 and hence reproduces as an output taken from its emitter the then lowest of the wheel speed signals from lines V1-V4, as the low wheel speed signal VL.

The high wheel gate HS is preferably generally similar in structure and hence here comprises a pair of diodes D27 and D28 having their anodes connected to the speed signal lines V1 and V2 and their cathodes connected together to a junction point P3. A similar pair of diodes D34 and D35 have their anodes connected to the speed signal lines V3 and V4 and their cathodes connected together to the junction point P3. A dropping resistor R46 connects the junction point P3 to ground. Accordingly, the one of the speed signal lines V1-V4 then at the highest potential will conduct through its corresponding diode D27, D28, D34 or D35 through point P3 and resistor R46 to ground, such that the potential across point P3 continuously tracks with the highest potential instantaneously appearing on any one of speed signal lines V1-V4. Another emitter follower transistor Q5, of polarity opposite that of transistor Q30, connects at its collector to ground and at its emitter through a resistor R42 to the positive supply point VC. The transistor Q5 is driven at its base through a resistor R74 by the potential on point P3 and provides at its emitter the high wheel speed signal VH proportional to the then highest one of the speed signals on lines V1-V4.

Sensors WS1-WS4 may respectively connect to any one of the four wheel assemblies being monitored, the choice being an arbitrary one. Thus, whether or not speed signals V1 and V2 (or V3 and V4) represent the operation of wheels on the same or different axles or on the same or different sides of the vehicle, depends on choices made during system installation on the vehicle.

The average wheel gate AS here simply consists of a pair of resistors R93 and R43 connected in series between the low wheel and high wheel speed signal output lines VL and VH, the average wheel gate output line VA connecting between such resistors. For the sake of simplicity and because satisfactory system operation can thus be achieved, the signal actually appearing on line VA is not a true average of the wheel speed signals V1–V4. First, the signal line VA is not the result of averaging all four of such signals, but rather is based on only two, the instantaneously highest and lowest as represented by levels on the output lines VL and VA of the low wheel gate and high wheel gate, respectively. Second, it has been found advantageous to make the "averaging" resistors R93 and R43 unequal. In the embodiment shown, the potential on line VA is about 60% high wheel signal from line VH and about 40% low wheel signal from line VL, the resistors R93 and R43 being for example 33 k ohm and 20 k ohm.

The deceleration detector DD and combination fixed bleed - DWS circuit FD here disclosed are generally similar to the corresponding units of the aforementioned copending application Ser. No. 831,908, entitled Anti-Wheel Lock System. The structure and operation of the present units DD and FD do however differ in several significant respects from the corresponding units in said application.

In particular, it is important to note that the speed signal input to the deceleration detector circuit DD, at input point P20, to the left of differentiating capacitor C17, is from the low wheel speed signal line VL. This contrasts with feeding of the deceleration detector for a two-wheel system in said application with a signal substantially representing the average speed of the wheels. The present driving of deceleration detector DD from the low wheel line VL results from a finding that, in a tandem, or dual, axle situation where for example four wheels are included in the system, it was necessary for the deceleration detector to sense an impending wheel lock-up much sooner than might be determinable from the drop in the average speed of all four wheels. Thus, in the four wheel situation, three wheels acting in a satisfactory braking mode with only minor (e.g. optimum) slip could mask early deceleration toward lock-up of fourth wheel and thereby undesirably delay production of a lock signal by the deceleration detector unit DD. Accordingly, driving of the deceleration detection circuit DD from the low wheel line VL provides for sufficiently quick actuation of the deceleration detection circuit despite monitoring of the condition of all four tandem axle wheels.

To briefly summarize the operation of the deceleration detector DD, resistor R39 and capacitor C17 connected between the positive supply VX and the low speed gate emitter follower line VL form a simple RC differentiator connected to the negative input of comparator U3B, at the right side of capacitor C17. The positive input of the comparator carries a reference voltage having a fixed portion supplied by voltage divider resistors R41 and R61 connected between the positive supply point VX and ground and preferably a remaining portion varying somewhat with speed due to connection through relatively large (390 k ohm) resistor R40 to the low wheel speed line VL. In the particular embodiment shown, wherein nonlinear F/V convertors FV1–FV4 are used, there is reduced change in the reference signal supplied to the comparator U3B over the normal speed range of the apparatus.

When the deceleration rate of the low speed wheel becomes excessive, suggesting increasing slip toward lock-up, the resulting time differential voltage applied by capacitor C17 to the negative comparator input reaches the reference amplitude at the reference input to the comparator and the comparator U3B initiates a lock signal through diode D11 to lock signal line SS.

The clamp incorporating comparator U3C, with its inputs connected across resistor R39 and its minus input connected through diode D10 to its output and through very high (e.g. 1M ohm) bypass resistor R49 to ground, permits use of the very simple RC differentiator R39, C17 by preventing saturation of the sample RC differentiator during wheel roll-up from delaying initiation of a subsequent lock signal by the deceleration detector. Particularly, after braking is applied and released, such that the monitored wheel starts to accelerate up to vehicle speed, the differentiator capacitor C17 generates a rapidly growing and potentially high voltage spike which is applied to the negative input of the comparator U3B, and to clamp comparator U3C. At a preselected point in this voltage rise, clamp comparator U3C turns on and diode D10 conducts away the current which would otherwise raise the voltage on the right hand side of the capacitor C17. The reference voltage applied to the positive input of the clamp comparator is normally relatively low (e.g. two volts) precluding such saturation of the differentiator R39, C17, and permitting rapid response of the deceleration detector DD to reapplication of the brakes.

In general then the deceleration detector circuit DD responds to rapid "low wheel" deceleration, exceeding the reference rate, by applying a positive going lock signal from the output of comparator U3B through diode D11 to the lock signal line SS, such lock signal ending as the wheel deceleration abates or disappears with release of the brakes.

Turning to the combination fixed bleed - DWS circuit FD, under certain vehicle operating conditions, such as with light vehicle loading and slush or slippery road surfaces, application of the brakes may result in a rapid wheel deceleration permitting lock-up, and consequent disappearance of the deceleration signal at the deceleration detector comparator input, before the deceleration detector DD has had time to release or fully release the brakes, as due to time lags normally present in a hydraulic, and particularly in pneumatic, braking systems. The deceleration detector DD would, under such conditions, terminate its lock signal, allowing reapplication of braking forces and continuation of the lock-up condition. The fixed bleed circuitry at FD overcomes this problem.

To briefly summarize the operation of circuit FD, which may be generally similar to that disclosed in the aforementioned application, the transistor Q14 normally charges capacitor C18, in the absence of a lock signal on line SS, to a value which is some preselected percentage of the high wheel speed signal on line VA, as set by the ratio of resistors in voltage divider R45, R47. Accordingly, the charge on capacitor C18, and thus the voltage on the positive reference input of comparator U3A, under this condition represents a preselected percentage of the instantaneous vehicle speed. The minus input of comparator U3A monitors the simulated average wheel speed signal on line VA.

Fixed bleed operation is initiated by appearance of a lock signal on line SS from the deceleration detector DD indicating too rapid deceleration (excessive slip) toward lock-up of one and normally of several of the four monitored wheels. The high positive lock signal acts through resistor R64 to turn off normally conductive charging transistor Q14 whereupon the capacitor C18 discharges at a constant rate through series bleed transistor Q6 and series current limiting resistor R48 to ground, the base of transistor Q6 being set at the constant potential VX. The discharge rate of capacitor C18 is selected such that the voltage on the positive reference terminal of comparator U3A drops at a rate to simulate the rate of deceleration of the vehicle on a low friction surface. With one and particularly several of the monitored wheels decelerating rapidly toward lock-up, the modified average wheel speed signal on line VA soon drops below the vehicle speed simulating reference on the positive input of the comparator U3A so that the latter can itself produce a relatively high voltage (lock signal) on line SS. The original lock signal from deceleration detector DD having shut off the brakes, the fixed bleed lock signal now appearing on line SS takes over and holds the brakes off until wheels spin up to sufficient speed that the modified average signal on line VA rises once again above the reference set by discharging capacitor C18 whereafter braking can resume. A number of these deceleration detection - fixed bleed cycles may be required to bring the vehicle to a halt from speed on a slippery road.

In its DWS mode the circuit FD produces a lock signal, turning off the brakes, when at least one but not all of the wheels decelerate rapidly toward lock-up (one or two wheels on ice and the others on dry pavement, for example). In this uneven braking condition, the modified average wheel speed signal on line VA drops below the high wheel speed signal on line VH and soon falls below the high speed wheel percentage signal carried by capacitor C18 with transistor Q14 conductive. This triggers comparator U3A which raises its output level and through diode D12 applies a lock signal (high voltage) on line SS disabling the brakes.

By weighting the amplitude of the signal on line VA more in favor of the high wheel speed signal VH, rather than the low speed wheel signal on line VL, the locking or low friction wheel must drop to a somewhat lower speed, than would otherwise be the case, before DWS comparator U3A produces its brake disabling lock signal.

As a practical matter, it was found convenient in constructing a system in accord with FIG. 2 to implement the filter and frequency to voltage convertors circuitry, together with the high and low wheel gating diodes (i.e. that circuitry between broken lines H1 and H2 in Figure) for each pair of wheel speed sensors WS1, WS2 and WS3, WS4 as a thick film hybrid, permitting the present circuitry for monitoring four wheels to be placed in a space on the vehicle which would normally be filled by more conventionally implemented monitoring circuitry for only two wheels.

As a further practical implementation note, operational amplifiers and comparators are commonly commercially available in units of four, and with the operational amplifier-comparator needs in the present four-wheel system satisfied for each of the filters F1-F4 and convertors FV1-FV4, thereupon a unit of four comparators can, as here, be used to satisfy the requirements of the disclosed circuits DD and FD with one left over for the fail safe circuit FS.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A lock control system for use with a vehicle having first and second spaced apart, independently rotatable wheels associated with one axle and third and fourth spaced apart independently rotatable wheels associated with another axle, and having a braking system for applying braking forces to said wheels, and comprising:
   means responsive to an applied lock signal for controlling said braking system to relieve the braking forces on said wheels;
   means for providing first, second, third and fourth wheel speed signals having values respectively representative of the wheel speeds of said first, second, third and fourth wheels;
   high wheel speed means for receiving said first, second, third and fourth wheel speed signals and providing therefrom a high wheel speed signal representative of the speed of the fastest of said wheels;
   low wheel speed means for receiving said first, second, third and fourth wheel speed signals and providing therefrom a low wheel speed signal representative of the speed of the slowest of said wheels;
   an average wheel speed means connected to said high wheel speed means at the high wheel speed signal output thereof and connected to said low wheel speed means at the low wheel speed signal output thereof and responsive to said high and low wheel speed signals for producing a signal of amplitude between and approximating the average of said high and low wheel speed signals, said average wheel speed means being free of direct connection to said first, second, third and fourth wheel speed signal providing means; and
   logic circuit means for providing a said lock signal when characteristics of the high and low wheel speed signals indicate a lock condition in one or more of said wheels of either of said axles.

2. A lock control system for use with a vehicle having first and second spaced apart, independently rotatable wheels associated with one axle and third and fourth spaced apart independently rotatable wheels associated with another axle, and having a braking system for applying braking forces to said wheels, and comprising:
   means responsive to an applied lock signal for controlling said braking system to relieve the braking forces on said wheels;
   means for providing first, second, third and fourth wheel speed signals having values respectively representative of the wheel speeds of said first, second, third and fourth wheels, and comprising corresponding first, second, third and fourth speed signal units;
   means for receiving said first, second, third and fourth wheel speed signals and providing therefrom a high wheel speed signal representative of the speed of the fastest of said wheels and a low wheel speed signal representative of the speed of the slowest of said wheels;
   a resistive voltage divider and means applying said high wheel speed signal and low wheel speed signal to opposite ends of said voltage divider, said voltage divider having an intermediate point for supplying an intermediate voltage approximating the average of said first through fourth wheel speed signals; and logic circuit means for providing a said lock signal when characteristics of the high and low wheel speed signals indicate a lock condition in one or more of said wheels of either of said axles.

3. The system of claim 2, in which said means providing said high wheel speed signal and low wheel speed signal comprise means responsive to any two of said first through fourth wheel speed signals for selecting the highest and lowest thereof, means responsive to the remaining two of said first through fourth wheel speed signals for selecting the highest and lowest thereof, means receiving said highest wheel speed signal from said any two and said highest wheel speed signal from said remaining two for selecting the greater thereof as said high wheel speed signal, and means receiving said lowest wheel speed signal from said any two and said lowest wheel speed signal from said remaining two for selecting the lesser thereof as said low wheel speed signal.

4. The system of claim 3, in which said means for providing first, second, third and fourth wheel speed signals include first, second, third and fourth frequency to voltage converters responsive to rotation of respective vehicle wheels for producing said wheel speed signals, such that each wheel speed signal is independent of the other three said wheel speed signals.

5. The system of claim 4, including a pair of thick film hybrid units each providing two of said frequency to voltage converters and a portion of said receiving means responsive to the corresponding two of said first to fourth wheel speed signals for selecting the highest and lowest thereof.

6. The system of claim 2, in which said means for providing a high wheel speed signal and a low wheel speed signal comprising separate high wheel speed means and low wheel speed means which each comprise a first back-to-back connected pair of diodes connected between the outputs of two of said wheel speed signal units and a similar pair of back-to-back diodes connected between the outputs of the remaining two of said wheel speed signal units, and a voltage source connected through a voltage dropping element to a point in turn commonly connecting between the diodes of each of said first and second pairs, the diodes of said high wheel speed signal providing means being oriented in a sense opposite that of the diodes in said low wheel speed providing means.

7. The system of claim 6 including emitter follower transistors respectively connected to said points for providing said high wheel speed signal and low wheel speed signal, respectively.

8. The system of claim 2 in which said logic circuit means includes a deceleration detector circuit having a reference input and a differentiating input both connected to the low wheel speed signal output of said high and low wheel speed signal providing means.

9. The system of claim 2 in which said resistive voltage divider comprises two unequal resistors such that said average signal is a weighted average, weighted in favor of said high wheel speed signal, said logic circuit means including a fixed bleed-DWS circuit connected to said intermediate point on said voltage divider, at one input thereto, and having a second input receiving a percentage of the high wheel speed signal.

* * * * *

UNITED STATES PATENT AND TRADEMARK OFFICE
CERTIFICATE OF CORRECTION

PATENT NO. : 4 134 621
DATED : January 16, 1979
INVENTOR(S) : Daniel G. Smedley

It is certified that error appears in the above-identified patent and that said Letters Patent are hereby corrected as shown below:

Abstract, last line; Change "skid" to ---locked wheel---.

Column 1, line 19; change "coved" to ---could---.

line 51; change "hereto" to ---here to---.

Column 3, line 26; change "prasses" to ---passes-.

Column 8, line 9; change "sample" to ---simple---.

Signed and Sealed this

Twenty-ninth Day of May 1979

[SEAL]

Attest:

RUTH C. MASON
Attesting Officer

DONALD W. BANNER
Commissioner of Patents and Trademarks